(12) United States Patent
Peng et al.

(10) Patent No.: US 12,734,712 B2
(45) Date of Patent: Sep. 15, 2026

(54) GRIPPER AND ROBOT

(71) Applicants: SHANGHAI FLEXIV ROBOTICS TECHNOLOGY CO., LTD., Shanghai (CN); FLEXIV LTD., Grand Cayman (GB)

(72) Inventors: Juncai Peng, Shanghai (CN); Xiaojun Wang, Shanghai (CN); Ran An, Santa Clara, CA (US)

(73) Assignees: SHANGHAI FLEXIV ROBOTICS TECHNOLOGY CO., LTD., Shanghai (CN); FLEXIV LTD., Cayman Islands (GB)

(*) Notice: Subject to any disclaimer, the term of this patent is extended or adjusted under 35 U.S.C. 154(b) by 990 days.

(21) Appl. No.: 17/997,627

(22) PCT Filed: Jun. 13, 2022

(86) PCT No.: PCT/CN2022/098389
§ 371 (c)(1),
(2) Date: Oct. 31, 2022

(87) PCT Pub. No.: WO2023/240399
PCT Pub. Date: Dec. 21, 2023

(65) Prior Publication Data
US 2024/0300117 A1 Sep. 12, 2024

(51) Int. Cl.
*B25J 15/02* (2006.01)
*B25J 15/08* (2006.01)

(52) U.S. Cl.
CPC ........... *B25J 15/026* (2013.01); *B25J 15/086* (2013.01)

(58) Field of Classification Search
CPC ..... B25J 15/026; B25J 15/086; B25J 15/0266
See application file for complete search history.

(56) References Cited

U.S. PATENT DOCUMENTS 2,384,636 A * 9/1945 Nelson ...................... B66C 1/48 294/102.1
3,952,880 A * 4/1976 Hill ........................ B25J 19/021 901/29

(Continued)

FOREIGN PATENT DOCUMENTS

CN 102069502 A 5/2011
CN 202825851 U 3/2013

(Continued)

OTHER PUBLICATIONS

International Search Report dated Aug. 26, 2022 issued in counterpart Parent Application No. PCT/CN2022/098389 (5 pages).

(Continued)

*Primary Examiner* — Stephen A Vu
(74) *Attorney, Agent, or Firm* — GREENBLUM & BERNSTEIN, P.L.C.

(57) ABSTRACT

Provided are a gripper and a robot. The gripper includes a case, a plurality of gripping assemblies respectively assembled to the case, and a driving assembly configured to move the plurality of gripping assemblies. Each gripping assembly is provided with a fingertip at an end portion, and fingertips of the gripper are configured to cooperate with each other for grasping. Each gripping assembly further includes a gear set and a gear carrier rotatably connected to the case. The gear set includes a fixed gear, an intermediate gear and a fingertip gear engaged in sequence. The fixed gear is fixedly connected to the case, and the fingertip gear is fixedly connected to the fingertip. The intermediate gear and the fingertip gear are mounted to the gear carrier and respectively rotatably connected to the gear carrier. The driving assembly is configured to rotate the gear carrier.

16 Claims, 8 Drawing Sheets

(56) References Cited

U.S. PATENT DOCUMENTS

| | | | | |
|---|---|---|---|---|
| 6,217,094 | B1 * | 4/2001 | Hanaduka | B25J 15/0213 901/46 |
| 6,508,496 | B1 * | 1/2003 | Huang | E01H 1/12 294/115 |
| 8,534,729 | B2 * | 9/2013 | Wilkinson | B25J 15/08 901/34 |
| 11,351,676 | B2 * | 6/2022 | Greene | B25J 9/1697 |
| 2014/0180477 | A1 | 6/2014 | Chung et al. | |

FOREIGN PATENT DOCUMENTS

| | | | |
|---|---|---|---|
| CN | 107351105 | A | 11/2017 |
| CN | 109366517 | A | 2/2019 |
| CN | 109500834 | A | 3/2019 |
| CN | 109571521 | A | 4/2019 |
| CN | 209504144 | U | 10/2019 |
| CN | 209533423 | U | 10/2019 |
| CN | 210588358 | U | 5/2020 |
| CN | 111483605 | A | 8/2020 |
| CN | 213562622 | U | 6/2021 |
| CN | 113183168 | A | 7/2021 |
| CN | 214025770 | U | 8/2021 |
| JP | 2008-238326 | A | 10/2008 |
| JP | 2021146444 | A | 9/2021 |

OTHER PUBLICATIONS

Notification of Transmittal of the International Search Report and the Written Opinion of the International Searching Authority, or the Declaration dated Aug. 26, 2022 issued in counterpart Parent Application No. PCT/CN2022/098389 (1 page).

Written Opinion dated Aug. 26, 2022 issued in counterpart Parent Application No. PCT/CN2022/098389 (4 pages).

Z. Huang et al., "Theory and Control of Parallel Robot Mechanisms", Machinery Industry Press, May 31, 1997, pp. 83.

Z. Huang et al., "Space Mechanics", Machinery Industry Press, May 31, 1991, pp. 226.

Second Office Action in related CN Application No. 202210664305.7, issued Apr. 23, 2024, 11 pages.

Third Office Action in related CN Application No. 202210664305.7, issued Jul. 9, 2024, 12 pages.

First Office Action in related Chinese Application No. 202210664305.7, issued Nov. 30, 2023, 13 pgs.

* cited by examiner

GRIPPER AND ROBOT

CROSS-REFERENCE TO RELATED APPLICATION

This application is a National Phase of International Application No. PCT/CN2022/09838 9, filed Jun. 13, 2022, the content of which is incorporated herein by reference in its entirety.

TECHNICAL FIELD

The present disclosure generally relates to the robotics field, and in particular to a gripper and a robot including the same.

BACKGROUND

Generally, an industrial robot is used to repeatedly perform a wide variety of manufacturing, assembling and material movement operations. A gripper is usually connected to an end portion of a robot as an end effector of the robot, and cooperates with the robot to realize grasping or releasing of a target object.

However, structure and performance of current robot grippers still need to be improved to meet the demand for high frequency use.

SUMMARY

According to an aspect of the present disclosure, some embodiments provide a gripper, including: a case, a plurality of gripping assemblies respectively assembled to the case, and a driving assembly configured to move the plurality of gripping assemblies. Each of the plurality of gripping assemblies is provided with a fingertip at an end portion, and fingertips of the plurality of gripping assemblies are configured to cooperate with each other for grasping. Each of the plurality of gripping assemblies further includes a gear set and a gear carrier rotatably connected to the case. The gear set includes a fixed gear, an intermediate gear and a fingertip gear that are engaged in sequence. The fixed gear is fixedly connected to the case, and the fingertip gear is fixedly connected to the fingertip. The intermediate gear and the fingertip gear are mounted to the gear carrier, and the intermediate gear and the fingertip gear are respectively rotatably connected to the gear carrier. The driving assembly is configured to rotate the gear carrier.

According to another aspect of the present disclosure, some embodiments further provide a robot including the above gripper.

The details of one or more embodiments of the disclosure are set forth in the accompanying drawings and the description below. Other features, objects and advantages of the present disclosure will become apparent from the description, drawings and claims.

BRIEF DESCRIPTION OF THE DRAWINGS

In order to illustrate technical solutions of the embodiments of the present disclosure more clearly, the following briefly introduces the accompanying drawings used in the description of the embodiments. The accompanying drawings in the following description are merely some exemplary embodiments of the present disclosure, but shall not be construed as a limitation to the scope of the disclosure.

DETAILED DESCRIPTION

Figure 1:
FIG. 1 is a perspective view of a gripper according to an embodiment of the present disclosure.
Figure 1:
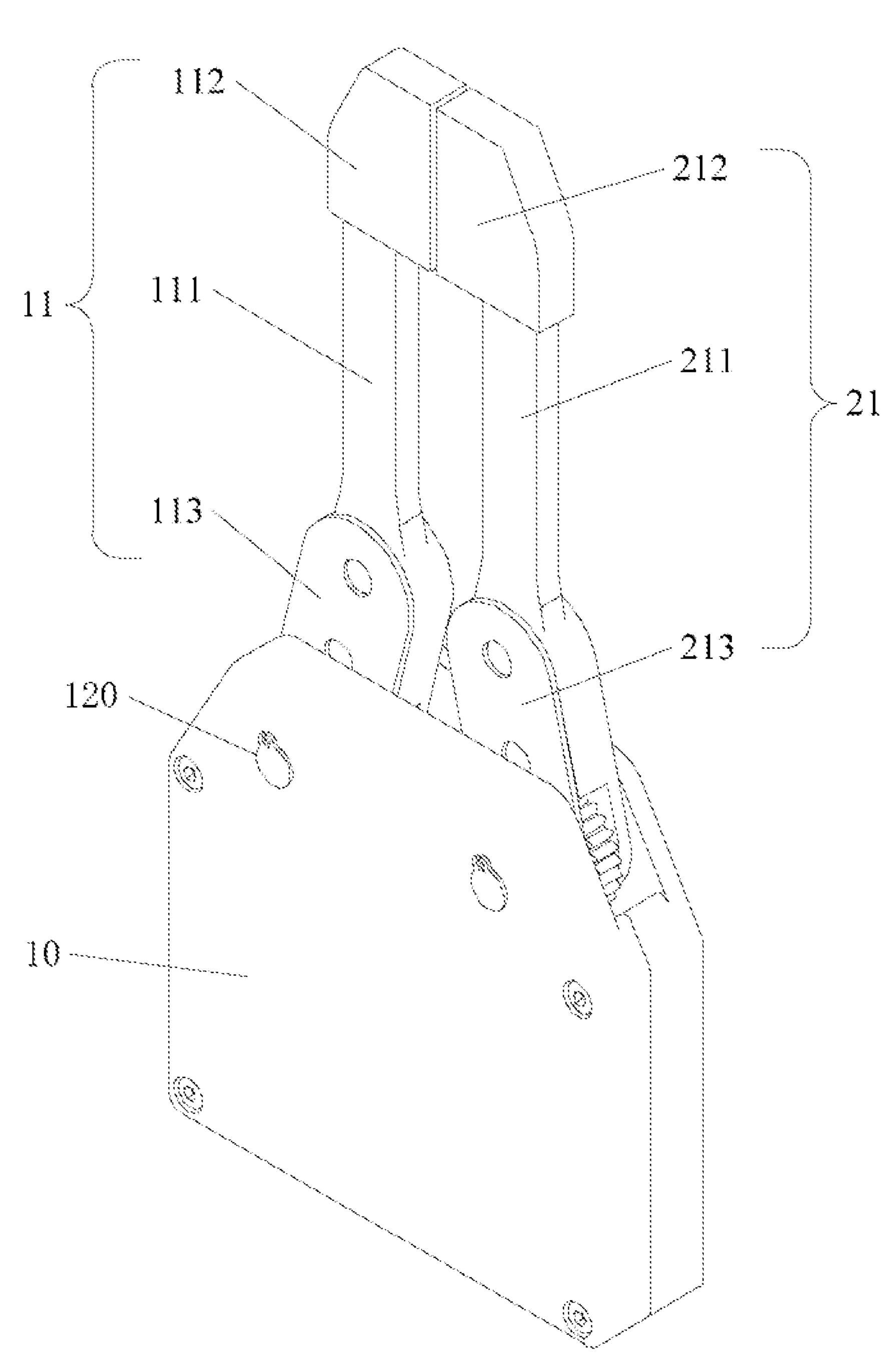
Figure 2:
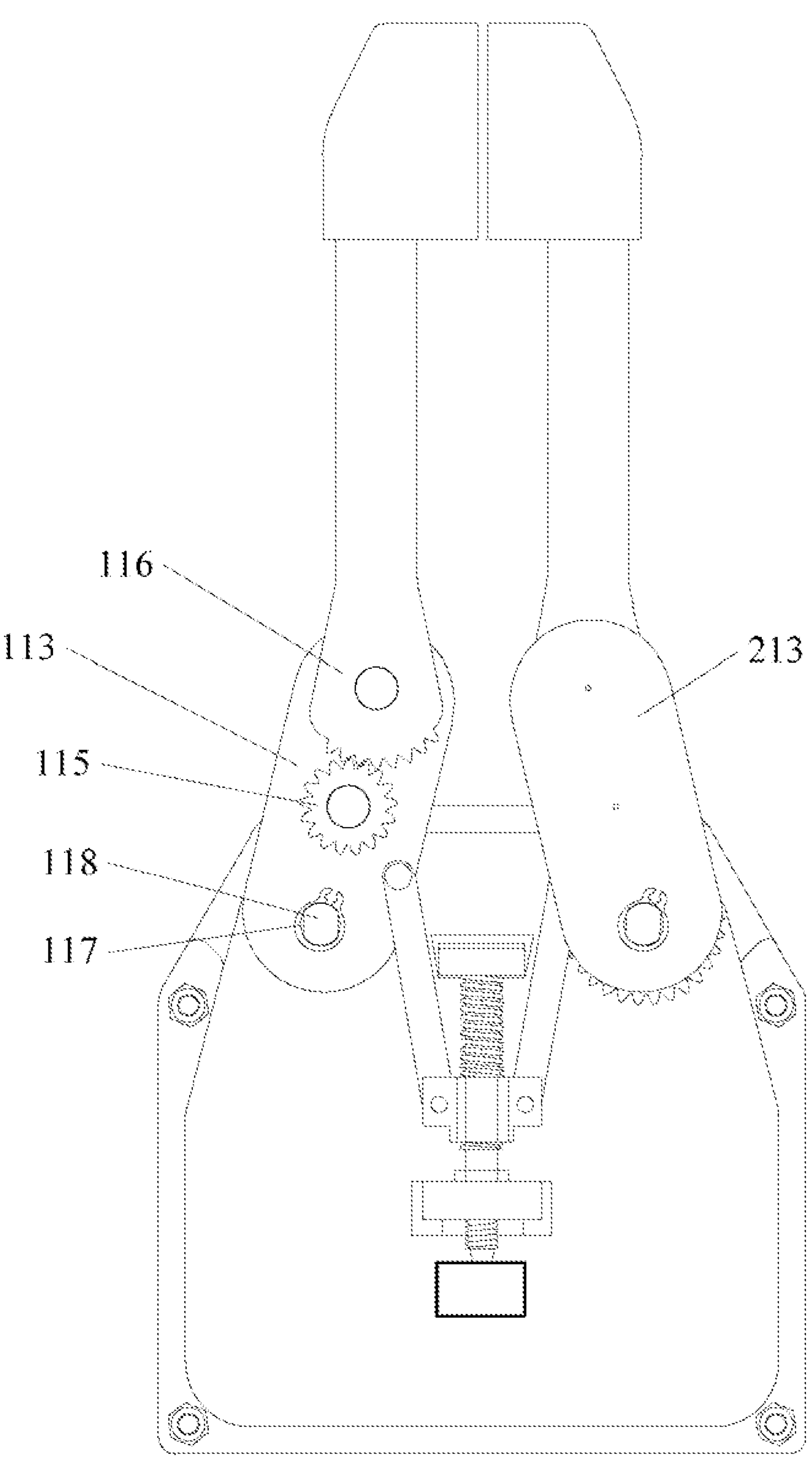
FIG. 2 is a schematic diagram of a gripper according to an embodiment of the present disclosure, showing a gear carrier of a gripping assembly.

In order to make the above objects, features and advantages of the present disclosure more clearly understood, the specific embodiments of the present disclosure are described in detail below reference to the accompanying drawings. In the following description, numerous specific details are set forth to provide thorough understanding of the present disclosure. However, the present disclosure may be implemented in many ways different from those described herein, and those skilled in the art may make similar improvements without violating the connotation of the present disclosure. Therefore, the present disclosure is not limited to the specific embodiments disclosed below.

In the description of the present disclosure, it should be understood that terms such as “center”, “longitudinal”, “lateral”, “length”, “width”, “thickness”, “upper”, “lower”, “front”, “back”, “left”, “right”, “vertical”, “horizontal”, “top”, “bottom”, “inside”, “outside”, “clockwise”, “counterclockwise”, “axial”, “radial”, “circumferential” and other indicated orientations or positional relationships are based on the orientations or positional relationships shown in the accompanying drawings, and are only for the convenience of describing the present disclosure and simplifying the description, rather than indicating or implying that the device or element referred to must have a specific orientation, be constructed and operate in a specific orientation, and therefore should not be deemed as a limitation of the present disclosure.

In the present disclosure, unless otherwise expressly specified and limited, terms such as “installation”, “link”, “connection”, “fixation”, “arrangement” and the like should be interpreted in a broad sense. For example, unless otherwise expressly defined, a “connection” may be a fixed connection, a detachable connection, or formed integrally; it may be a mechanical connection or an electrical connection; it may be a direct connection or an indirect connection through an intermediate medium. The connection may be an internal communication of the two elements or an interaction relationship of the two elements. As another example, when an element is referred to as being “fixed to” or “disposed to” another element, it may be directly on the other element or intervening elements may also be present. For those skilled in the art, the specific meanings of the above terms in the present disclosure may be understood according to specific situations.

Some embodiments of the present disclosure provide a gripper including a case, a plurality of gripping assemblies respectively assembled to the case, and a driving assembly configured to move the plurality of gripping assemblies. Each of the plurality of gripping assemblies is provided with a fingertip at an end portion, and fingertips of the plurality of gripping assemblies are configured to cooperate with each other for gripping. Each of the plurality of gripping assemblies further includes a gear set and a gear carrier. The gear set includes a fixed gear, an intermediate gear and a fingertip gear engaged in sequence. The fixed gear is fixedly connected to the case, and the fingertip gear is fixedly connected to the fingertip. The gear carrier is rotatably connected to the case, the intermediate gear and the fingertip gear are mounted to the gear carrier, and the intermediate gear and the fingertip gear are respectively rotatably connected to the gear carrier. The driving assembly is configured to rotate the gear carrier.

Based on this, according to some embodiments of the present disclosure, a gripper with a gear transmission mechanism is provided, which can realize closing and opening operations between fingertips at the end portion of the gripper, so as to grasp or release a target object. The gripper may be utilized as an end effector of a robot.

The applicant has developed a gripper of a robot by using a parallelogram linkage configuration to control the movement of the fingertips at the end portion of the gripper. Taking the gripper including two fingertips as an example, a first fingertip is connected to a first parallelogram mechanism, and a second fingertip is connected to a second parallelogram mechanism. The first parallelogram mechanism and the second parallelogram mechanism change relative positions of the first fingertip and the second fingertip during the movements, so as to realize the closing and opening operations of the first fingertip and the second fingertip. However, the inventors noted that during the movements of the gripper, an interior angle of the first parallelogram mechanism and the second parallelogram mechanism may change with different motion postures, resulting in a risk that an object or an operator may enter a position of an acute angle of the parallelogram linkage configuration by accident, causing unnecessary damage to human being or equipment.

According to some embodiments of the present disclosure, instead of using a parallelogram linkage configuration, a gear transmission configuration is adopted for the gripper, which can effectively avoid the risk of causing an operator injury due to a dead angle of motion of the gripper, and thus the gripper is relatively safe and reliable.

In addition, in the case that the gripper adopts the linkage transmission configuration, since input and output loads of the linkage transmission configuration change with the different motion postures, links may be under unbalanced forces in each motion posture, which may result in a larger gap of a transmission pair. Thus, a resistance of the transmission pair is increasing, and the transmission efficiency decreases accordingly. The transmission pair of the linkage transmission configuration is not easy to be lubricated, which may aggravate the movement resistance and accelerate the damage to the linkage transmission configuration, thereby affecting the transmission accuracy of the linkage transmission configuration. Furthermore, some linkage configurations may be bulky in size and large in motion range, and the design may be relatively complex, which may be not conducive to achieve an accurate motion posture and not conducive to realize a miniaturized design. Compared with a gripper using the linkage transmission configuration, the gripper according to the embodiments of the present disclosure adopts the gear transmission structure, which has high transmission efficiency, accurate transmission accuracy, simple and compact structure, and is easy to realize the miniaturized design.

The inventors have also noted that in the case that the gripper adopts a worm gear configuration, the material of an engaging surface is likely to wear, and the worn debris may fall into an electronic circuit, thereby causing a risk such as short circuit, and deteriorating a lubrication effect due to the inclusion of debris. In addition, for the worm gear configuration, an axial force on the worm shaft may be large and bearing wear may be severe. In contrast, the gripper according to the embodiments of the present disclosure adopts a gear transmission configuration, during the entire transmission cycle, a force applied to the engaging teeth of each gear is relatively small and uniform, and thus the engaging teeth are not susceptible to wear but are conducive to lubrication, thereby effectively preventing worn debris from falling into an electronic circuit to cause short circuit. Therefore, the gripper according to the embodiments of the present disclosure can have low maintenance cost and long service life.

Referring to FIGS. 1 to 5, according to some embodiments of the present disclosure, the gripper 1 includes a case 10, a first gripping assembly 11 and a second gripping assembly 21 respectively mounted to the case 10 and disposed opposite to each other, and a driving assembly configured to drive the first gripping assembly 11 and the second gripping assembly 21. In other embodiments, the gripper 1 may include more gripping assemblies, such as three or more gripping assemblies. Correspondingly, there may be one or more driving assemblies configured to drive the three or more gripping assemblies. Herein, the plurality of gripping assemblies are disposed such that a gripping surface of each gripping assembly is utilized to face a target object to be grasped. In an example, the plurality of gripping assemblies are evenly arranged in a circumferential direction of the gripper. In another example, in the case that the gripper includes an even number of gripping assemblies, the gripping assemblies may be oppositely arranged in pairs. In different embodiments of the present disclosure, the arrangement of the plurality of gripping assemblies may be selected and designed as actual application, which will not be described in detail herein. In this disclosure, for facilitating description, an exemplary gripper including two gripping assemblies (i.e., a first gripping assembly 11 and a second gripping assembly 21) will be adopted for subsequent descriptions.

The case 10 of the gripper 1 may be made of metal material, non-metal material or composite material, such as aluminum, aluminum alloy, steel, carbon fiber reinforced composite and the like. The case 10 may define accommodation space for receiving other components. The case 10 may be a closed or a semi-closed structure sealed by sufficient means (e.g., screwing, soldering or bonding), so as to protect the components disposed inside the case 10 from being affected by moisture, dust or an external force.

The first gripping assembly 11 includes a first fingertip 111 disposed at an end portion, and the second gripping assembly 21 includes a second fingertip 211 disposed at an end portion. At least a part of the first fingertip 111 and at least a part of the second fingertip 211 are disposed outside the case 10, and the first fingertip 111 and the second fingertip 211 cooperate with each other for grasping or releasing the target object. In an embodiment, the first fingertip 111 may be covered with a first fingerstall 112, and the second fingertip 211 may also be covered with a second fingerstall 212. The first fingerstall 112 and the second fingerstall 212 cooperate with each other, and gripping surfaces of the two fingerstalls are arranged opposite to each other. In an embodiment, the first fingerstall 112 and the second fingerstall 212 may be flexible parts for protecting the target object to be grasped from abrasion. In an embodiment, the fingertip and the fingerstall may be integrally formed.

The first gripping assembly 11 further includes a first gear set and a first gear carrier 113. The first gear set includes a first fixed gear 114, a first intermediate gear 115 and a first fingertip gear 116 that are engaged in sequence. The first gear carrier 113 is configured to mount the first gear set. At least a part of the first gear set and at least a part of the first gear carrier 113 are disposed inside the case 10 to protect the first gear set and the first gear carrier 113 from being affected by an external force.

The first fixed gear 114 is fixedly connected to the case 10, that is, during the operation of the gripper 1, the first fixed gear 114 would not move relative to the case 10. In an embodiment, the first fixed gear 114 may be fixedly connected to a first fixed gear shaft 118 by a flat key 117. The first fixed gear shaft 118 is fixedly mounted to the case 10 to prevent rotating of the fixed gear shaft 118 relative to the case 10. In an example, the first fixed gear shaft 118 is mounted to the case 10 through a flat slot for restraining, so as to prevent rotating of the fixed gear shaft 118 relative to the case 10. In another example, upper and lower covers of the case 10 may be respectively provided with a mounting hole 120 (e.g., a countersunk hole), and the first fixed gear shaft 118 is fixedly mounted to the respective mounting hole 120 to prevent rotating of the fixed gear shaft 118 relative to the case 10.

The first intermediate gear 115 is mounted to the first gear carrier 113 by a first intermediate gear shaft 121. The first intermediate gear 115 is disposed about the first intermediate gear shaft 121 and is rotatably connected to the first gear carrier 113. In an embodiment, the first intermediate gear 115 is an idle gear, and the first gear carrier 113 is box-shaped, so as to provide accommodation space for receiving the first fixed gear 114, the first intermediate gear 115 and the first fingertip gear 116 engaged in sequence. For example, the first gear carrier 113 may be a closed or semi-closed box-like structure, so as to protect the inside gears from being affected by moisture, dust or an external force. In an embodiment, the first intermediate gear 115 is a planetary gear, and the first gear carrier 113 is a planetary carrier for arranging and installing the first fixed gear 114, the first intermediate gear 115 and the first fingertip gear 116 engaged in sequence. Thus, the structure is simple and easy to maintain. In different embodiments of the present disclosure, the specific structure of the first gear carrier may be selected and designed according to actual practice, which will not be described in detail herein.

The first fingertip gear 116 is fixedly connected to the first fingertip 111. For example, the first fingertip gear and the first fingertip 111 may be in an integral structure. The first fingertip gear 116 is mounted to the first gear carrier 113 by the first fingertip gear shaft 122. The first fingertip gear 116 is disposed about the first fingertip gear shaft 122 and is rotatably connected to the first gear carrier 113. In other embodiments, the first fingertip gear 116 may be fixed to the first fingertip 111 in other manners.

The first gear carrier 113 is rotatably connected to the case 10. In an embodiment, the first fixed gear shaft 118 passes through the first gear carrier 113 to mount to the case 10. In this case, the first gear carrier 113 may be configured to be capable of rotating relative to the case 10 about the center of the fixed gear (e.g., the first fixed gear shaft 118). In another embodiment, the first gear carrier 113 may be connected to the case 10 by some component other than the first fixed gear shaft 118, but its rotation axis relative to the case 10 should be coaxially disposed with the first fixed gear shaft 118 (i.e., an axis of the first fixed gear shaft 114). In different embodiments of the present disclosure, the installation manner of the first gear carrier 113 may be selected and designed according to actual practice, which will not be described in detail herein.

The second gripping assembly 21 is similar in structure to the first gripping assembly 11, and the two gripping assemblies are symmetrically distributed. Specifically, the second gripping assembly 21 includes a second gear set and a second gear carrier 213. The second gear set includes a second fixed gear 214, a second intermediate gear 215 and a second fingertip gear 216 that are engaged in sequence. The second fixed gear 214 is fixedly connected to the case 10. The second intermediate gear 215 is mounted to the gear carrier by a second intermediate gear shaft 221. The second intermediate gear 215 is disposed about the second intermediate gear shaft 221 and is rotatably connected to the second gear carrier 213. The second fingertip gear 216 is fixedly connected to the second fingertip 211. The second fingertip gear 216 is mounted to the second gear carrier 213 by a second fingertip gear shaft 222. The second fingertip gear 216 is disposed about the second fingertip gear shaft 222 and is rotatably connected to the second gear carrier 213. The second gear carrier 213 is rotatably connected to the case 10. For other details of the second gripping assembly 21 of the gripper 1, reference may be made to the above-mentioned description of the first gripping assembly 11, which will not be repeated herein.

Figure 3:
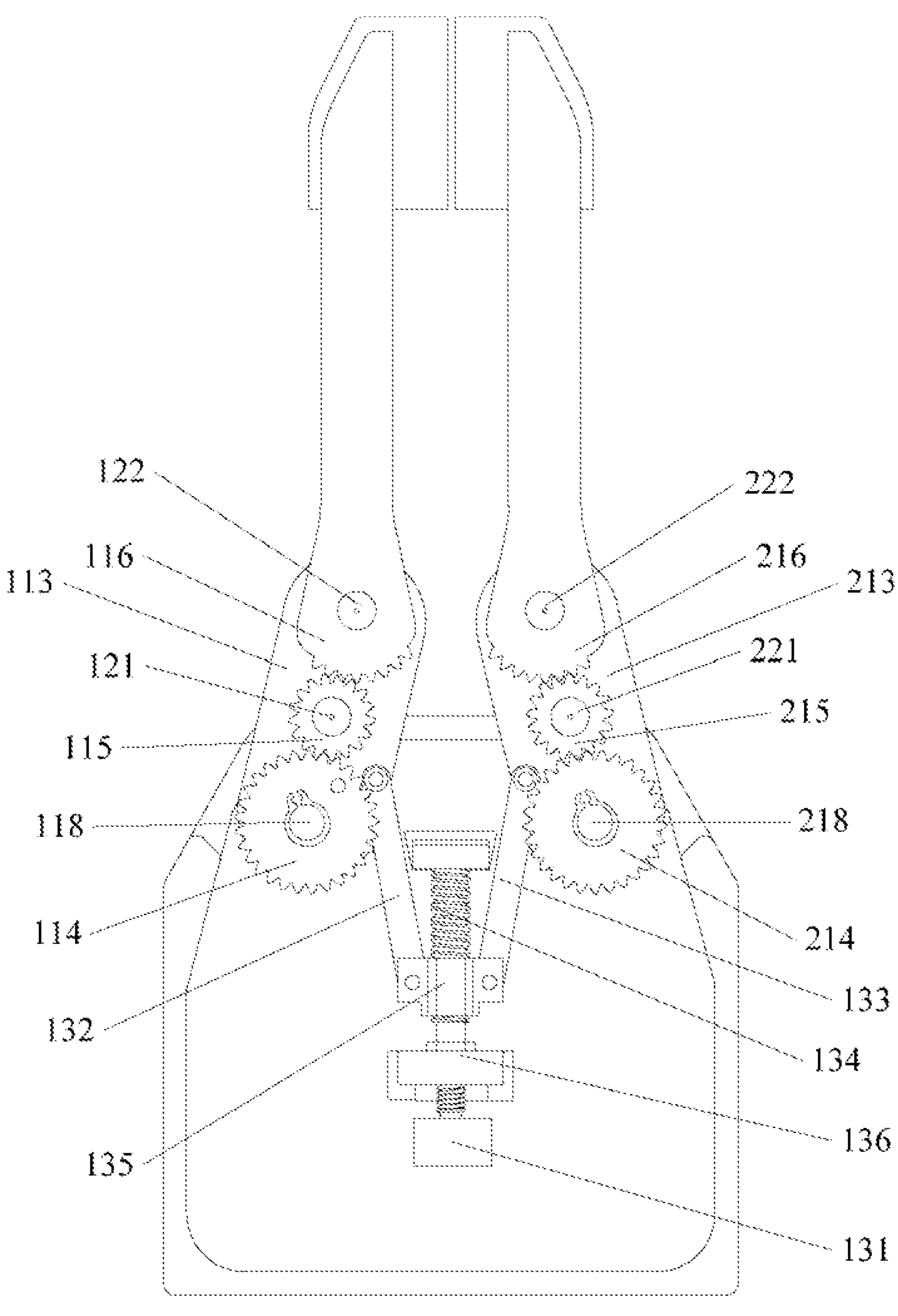
FIG. 3 is a schematic diagram of a gripper in a closed state according to an embodiment of the present disclosure, showing a gear set and a driving assembly.

The driving assembly is configured to rotate the gear carrier, and further move the first gripping assembly 11 and the second gripping assembly 21 accordingly. The driving assembly may include a driving member, a lead screw-nut member and a driving rod. Referring to FIG. 3, in an embodiment, the driving assembly includes a driving member 131, a lead screw-nut member and two driving rods, namely a first driving rod 132 and a second driving rod 133, for respectively driving the first gear carrier 113 and the second gear carrier 213.

The driving member 131 may be any driving member capable of providing a driving force. For example, the driving member 131 may be a motor or a hydraulic motor. At least a part of the driving member 131 is disposed inside the case 10 to protect the driving member 131 from being affected by moisture, dust or an external force.

Figure 5:
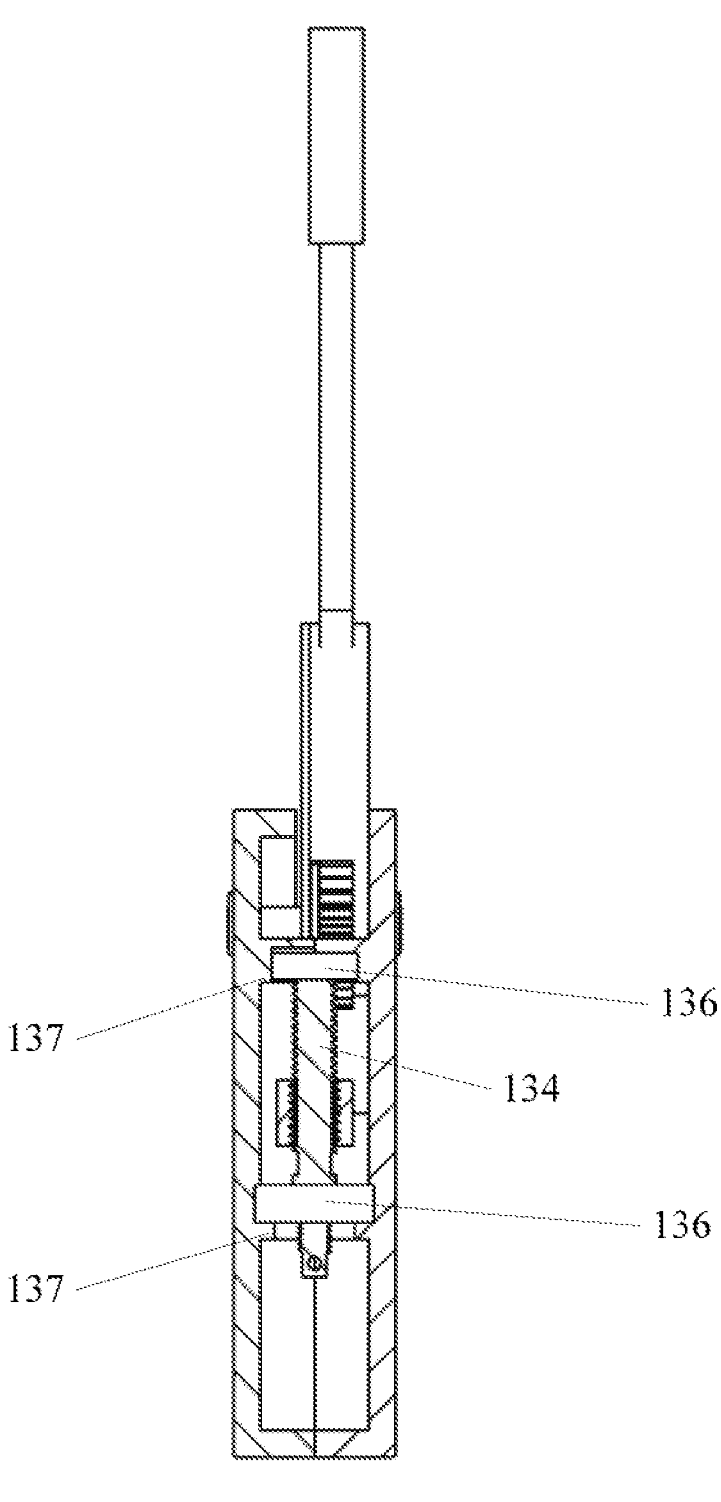
FIG. 5 is a schematic diagram of a gripper according to an embodiment of the present disclosure, showing a bearing and a bearing positioning mechanism.

The lead screw-nut member may include a lead screw 134 and a nut 135. The lead screw 134 is connected to the driving member 131, so that the driving member 131 may rotate the lead screw 134. The driving member 131 may be mounted to the case 10, and an output end of the driving member 131 is connected to the lead screw 134 to rotate the lead screw 134. The nut 135 is configured to cooperate with the lead screw 134, and to move along an axial direction of the lead screw 134 responsive to rotation of the lead screw 134. The nut 135 is restricted in rotation since it is connected to the first gear carrier 113 by the first driving rod 132 and the second gear carrier 213 by the second driving rod 133 respectively. The case 10 may be further provided with a bearing positioning mechanism 137, to which the lead screw-nut member is mounted by at least one bearing 136, as shown in FIG. 5.

A first end of the first driving rod 132 is connected to the nut 135 by a pivot pin 138 to form a revolute pair, and a second end of the first driving rod 132 is connected to the first gear carrier 113 by another pivot pin 138 to form another revolute pair. The second driving rod 133 is similar in structure to the first driving rod 132, and the two driving rods are symmetrically distributed. Specifically, a first end of the second driving rod 133 is connected to the nut 135 by a pivot pin 138 to form a revolute pair, and a second end of the second driving rod 132 is connected to the second gear carrier 213 by another pivot pin 138 to form another revolute pair. Therefore, responsive to the nut 135 moving along the axial direction of the lead screw 134, the first driving rod 132 drives the first gear carrier 113 to rotate relative to the case 10 and the second driving rod 133 drives the second gear carrier 213 to rotate relative to the case 10, and further to drive the first gear set and the second gear set respectively, thereby realizing the closing and opening operations between the first fingertip 111 and the second fingertip 211, to grasp or release the target object.

In the above embodiments, the first gripping assembly 11 and the second gripping assembly 21 of the gripper 1 are symmetrically arranged in structure, and the first driving rod 132 and the second driving rod 133 of the driving assembly are also symmetrically arranged in structure. In this way, it is ensured symmetrical and relative movement between the first fingertip 111 and the second fingertip 211, and consistency of the input driving force and the output force at different opening distances between the fingertips of the gripper 1. In addition, the driving assembly adopts a lead screw-nut member, which has a simple structure, facilitates to lubricate and maintain, and has high transmission efficiency.

The gripper 1 may include more gripping assemblies, e.g., three or more gripping assemblies. Correspondingly, the driving assembly includes three or more driving rods corresponding to the gripping assemblies in one-to-one correspondence. A first end of each driving rod is connected to a nut by a pivot pin to form a revolute pair, and a second end of each driving rod is connected to a gear carrier of a corresponding gripping assembly by another pivot pin to form another revolute pair. Therefore, responsive to the nut moving along the axial direction of the lead screw, each driving rod drives the gear carrier of a corresponding gripping assembly, thereby realizing the closing and opening operations between the multiple fingertips, to grasp or release the target object.

In some embodiments, the fixed gear, the intermediate gear and the fingertip gear are configured to be in a same plane. For example, the first fixed gear 114, the first intermediate gear 115 and the first fingertip gear 116 are configured to be in a same plane, and the second fixed gear 214, the second intermediate gear 215 and the second fingertip gear 216 are configured to be in a same plane. Therefore, according to the embodiments, it is ensured that the engaging teeth of the gripping assembly are uniformly loaded during gear transmission, the gears are less likely to be worn, the transmission precision is high, and a smaller product size can be achieved.

In some embodiments, the fixed gear and the fingertip gear have a same number of gear teeth and a same modulus. For example, the number of gear teeth and the modulus of the first fixed gear 114 and the first fingertip gear 116 are the same, and the number of gear teeth and the modulus of the second fixed gear 214 and the second fingertip gear 216 are the same. In this way, when the first gear carrier 113 is driven to rotate relative to the case 10, the posture of the first fingertip gear 116 with respect to the case 10 does not change while the first fingertip gear 116 follows the first gear carrier 113 to rotate. Similarly, when the second gear carrier 213 is driven to rotate relative to the case 10, the posture of the second fingertip gear 216 with respect to the case 10 does not change while the second fingertip gear 216 follows the second gear carrier 213 to rotate. Therefore, according to the embodiments, it is ensured that the first fingertip 111 and the second fingertip 211 maintain a translational movement and always face towards each other during the movement process, which brings high control precision.

Figure 4:
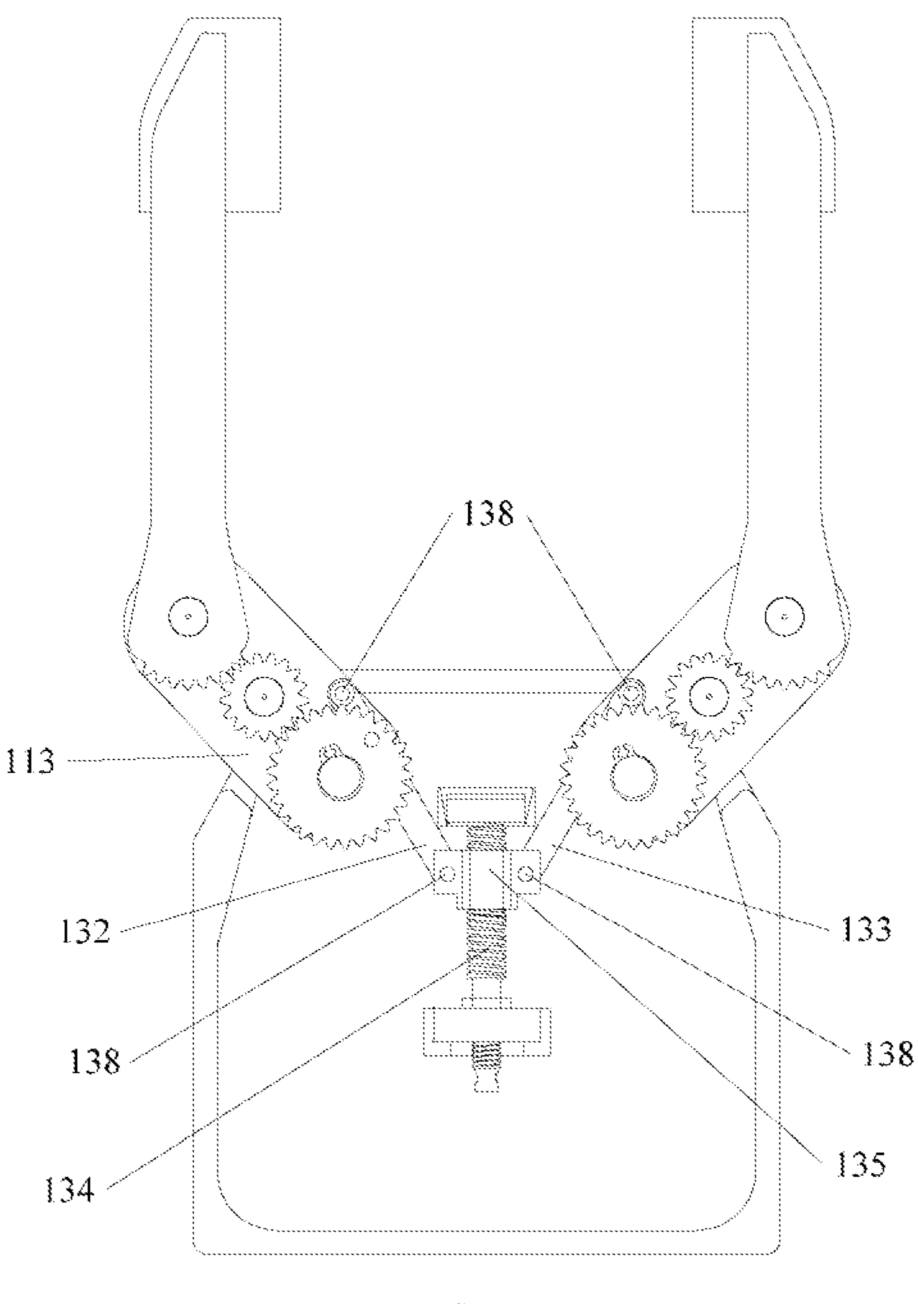
FIG. 4 is a schematic diagram of a gripper in an opened state according to an embodiment of the present disclosure, showing the gear set and the driving assembly.

Referring to FIGS. 3 and 4, the working process of the gripper is described below by taking the gripper including two gripping assemblies as an example. FIG. 3 is a schematic diagram when the gripper is in a closed state, and FIG. 4 is a schematic view when the gripper is in an opened state.

Responsive to an output end of the driving member 131 rotating the lead screw 134, the nut 135 moves up and down along the axial direction of the lead screw 134. Specifically, in FIG. 3, responsive to the nut 135 moving downward along the axial direction of the lead screw 134 (i.e., a direction away from the fingertip), the first driving rod 132 drives the first gear carrier 113 to rotate clockwise about the first fixed gear shaft 118 by a first angle, and meanwhile, the second driving rod 133 drives the second gear carrier 213 to rotate counterclockwise about the second fixed gear shaft by a first angle. In this case, the first gear carrier 113 drives the first intermediate gear 115 and the first fingertip gear 116 to rotate clockwise by the first angle. In addition, since the first intermediate gear 115 is engaged with the first fixed gear 114, the first intermediate gear 115 rotates clockwise about the first intermediate gear shaft 121 by a second angle. Therefore, the motion form of the first intermediate gear 115 may include clockwise revolution around the first fixed gear 114 engaged with the intermediate gear 115 and clockwise rotation about its own first intermediate gear shaft 121. The first intermediate gear 115 is also engaged with the first fingertip gear 116, so that responsive to the clockwise rotation of the first intermediate gear 115 by the second angle, the first fingertip gear 116 may be driven to rotate counterclockwise about the first fingertip gear shaft 122 by the second angle. Eventually, an output of the driving member may be converted into the first fingertip 111 revolving clockwise around the first fixed gear 114 and rotating counterclockwise about the first fingertip gear shaft 122, such that the first fingertip 111 may move towards the second fingertip 211.

Symmetrically, responsive to the second driving rod 133 driving the second gear carrier 213 to rotate counterclockwise about the second fixed gear shaft by the first angle, the second gear carrier 213 drives the first intermediate gear 215 and the second fingertip gear 216 to rotate counterclockwise by the first angle. In addition, since the second intermediate gear 215 is engaged with the second fixed gear 214, the second intermediate gear 215 rotates counterclockwise about the second intermediate gear shaft 221 by the second angle. Therefore, the motion form of the second intermediate gear 215 may include counterclockwise revolution around the second fixed gear engaged with the second intermediate gear 215 and counterclockwise rotation about its own second intermediate gear shaft 221. The second intermediate gear 215 is engaged with the second fingertip gear 216, so that responsive to the counterclockwise rotation of the second intermediate gear 215 by the second angle, the second fingertip gear 216 may be driven to rotate clockwise about the second fingertip gear shaft 222 by the second angle. Eventually, the output of the driving member may be converted into the first fingertip 111 revolving counterclockwise around the second fixed gear 214 and rotating clockwise about the second fingertip gear shaft 222, such that the second fingertip 211 may move towards the first fingertip 111.

Therefore, responsive to the nut 135 moving downward along the axial direction of the lead screw 134 (i.e., the direction away from the fingertip), the first fingertip 111 and the second fingertip 211 may move towards each other, thereby realizing the grasping of the target object.

In the case that the number of gear teeth and the modulus of the first fixed gear 114 and the first fingertip gear 116 are the same, and the number of gear teeth and the modulus of the first fixed gear 114 and the first fingertip gear 116 are the same, the first angle may be equal to the second angle, thereby ensuring the first fingertip 111 and the second fingertip 211 maintain a translational movement and always face towards each other during the movement process.

In FIG. 4, responsive to an output of the driving member driving the lead screw 134 to enable the nut 135 to move upward along the axial direction of the lead screw 134 (i.e., a direction close to the fingertip), the first driving rod 132 drives the first gear carrier 113 to rotate counterclockwise about the first fixed gear shaft 118, and meanwhile, the second driving rod 133 drives the second gear carrier 213 to rotate clockwise about the second fixed gear shaft 218. The motion form of the first intermediate gear 115 may include counterclockwise revolution around the first fixed gear 114 engaged with the first intermediate gear 115 and counterclockwise rotation about its own first intermediate gear shaft 121. The motion form of the first fingertip 111 may include counterclockwise revolution around the first fixed gear 114 and clockwise rotation about the first fingertip gear shaft 122, so that the first fingertip 111 moves away from the second fingertip 211. Symmetrically, the output of the driving member may be converted into the second fingertip 211 revolving clockwise around the second fixed gear 214 and rotating counterclockwise about the first fingertip gear shaft 122, so that the second fingertip 211 moves away from the first fingertip 111. Thus, the first fingertip 111 and the second fingertip 211 may move away from each other, thereby realizing the releasing of the target object. For other details of the opening operation of the gripper 1, reference may be made to the above-mentioned related description of the closing operation, which will not be repeated herein.

Some embodiments of the present disclosure further provide another driving assembly of the gripper. A difference from the previous embodiments is that the driving assembly includes a plurality of driving devices, e.g., driving motors configured to respectively drive a gear carrier of a gripping assembly corresponding to the gear carrier. The plurality of driving motors are disposed outside the case, and an output end of each driving motor passes through the case to connect to the gear carrier corresponding to the driving motor.

Figure 6:
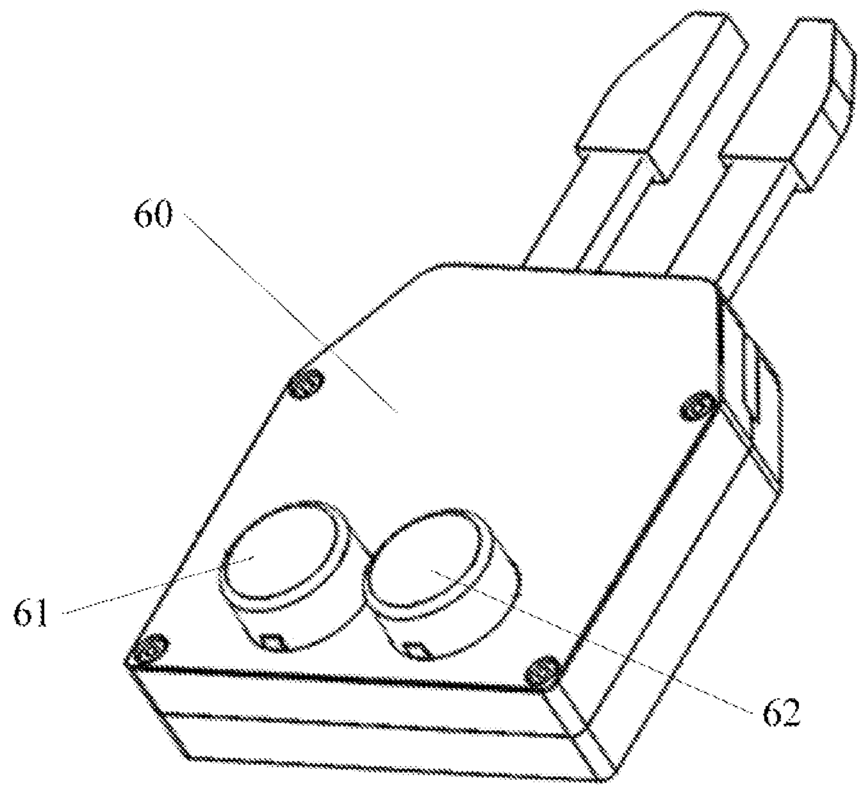
FIG. 6 is a perspective view of a gripper according to another embodiment of the present disclosure.
Figure 7:
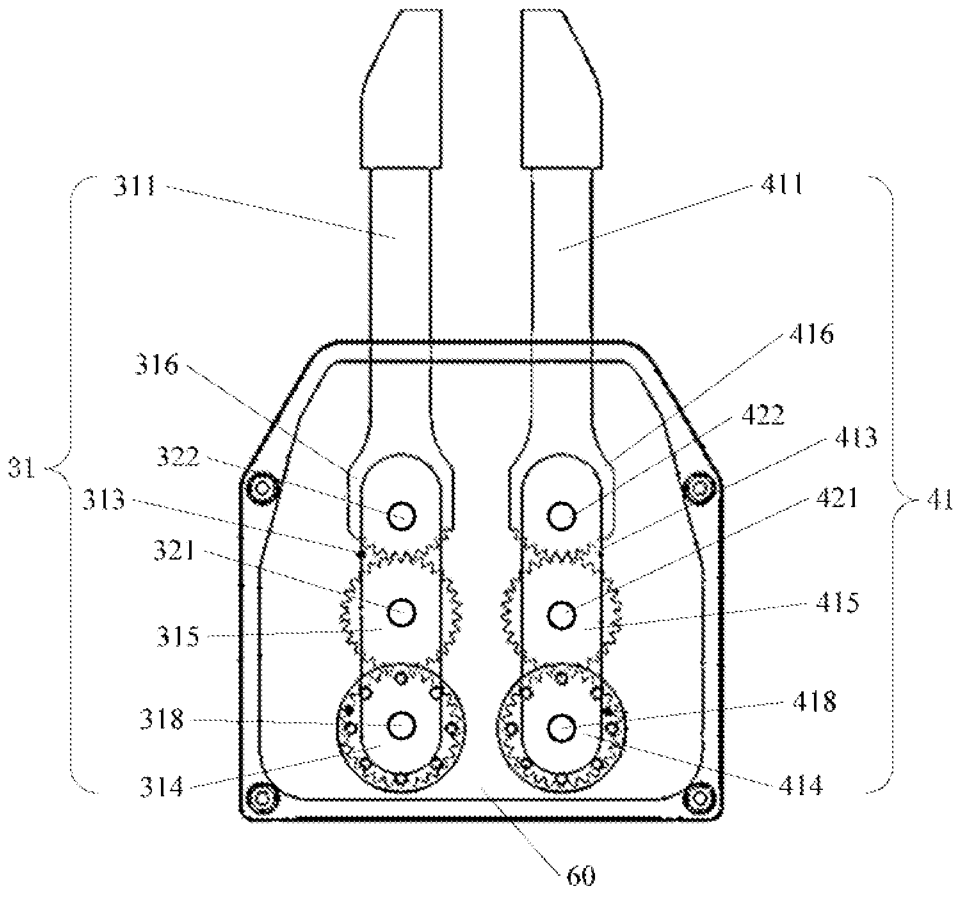
FIG. 7 is a schematic diagram of a gripper according to another embodiment of the present disclosure, showing a gear set and a gear carrier.

Referring to FIGS. 6 to 7, in an embodiment, the gripper includes a case 60, a first gripping assembly 31 and a second gripping assembly 41 respectively mounted to the case 60 and disposed opposite to each other, and driving assemblies configured to respectively drive the first gripping assembly 31 and the second gripping assembly 41. The first gripping assembly 31 includes a first fingertip 311 provided at an end portion, a first gear set and a first gear carrier 313. The first gear set includes a first fixed gear 314, a first intermediate gear 315 and a first fingertip gear 316 that are engaged in sequence. The first fingertip gear 316 is fixedly connected to the first fingertip 311. The first gear carrier 313 is configured to mount the first gear set. The first fixed gear 314 is fixedly connected to the case 60. The first intermediate gear 315 and the first fingertip gear 316 are rotatably connected to the first gear carrier 313. Similarly, the second gripping assembly 41 includes a second fingertip 411 provided at an end portion, a second gear set and a second gear carrier 413. The second gear set includes a second fixed gear 414, a second intermediate gear 415 and a second fingertip gear 416 that are engaged in sequence. The second fingertip gear 416 is fixedly connected to the second fingertip 411. The second gear carrier 413 is configured to mount the second gear set. The second fixed gear 414 is fixedly connected to the case 60. The second intermediate gear 415 and the second fingertip gear 416 are rotatably connected to the second gear carrier 413. The driving assembly includes two driving motors, namely, a first driving motor 61 and a second driving motor 62, which are configured to respectively rotate the first gear carrier 313 and the second gear carrier 413. The first driving motor 61 and the second driving motor 62 are respectively disposed outside the case 60. An output end of each driving motor penetrates through the case 60 to connect to a corresponding gear carrier, to drive the corresponding gear carrier to rotate relative to the case 60. The first driving motor 61 and the second driving motor 62 may work synchronously by a control signal.

Responsive to the first drive motor 61 driving the first gear carrier 313 to rotate clockwise around the first fixed gear shaft, the first intermediate gear 315 revolves around the first fixed gear 314 engaged with the first intermediate gear 315 and rotates about its own first intermediate gear shaft 321. The first gear carrier 313 drives the first fingertip gear 316 to revolve clockwise, and the first intermediate gear 315 drives the first fingertip gear 316 to rotate counterclockwise about its own first fingertip gear shaft 322. Moreover, the second drive motor 62 drives the second gear carrier 413 to rotate counterclockwise around its own second fixed gear shaft 418, resulting in that the second gear carrier 413 drives the second fingertip gear 416 and the second fingertip gear 416 to revolve counterclockwise, and the second intermediate gear 415 drives the second fingertip gear 416 to rotate clockwise about its own second fingertip gear shaft 422. Therefore, the movements of the first fingertip gear 416 and the second fingertip gear 416 realizes that the first fingertip 311 and the second fingertip 411 move towards each other, thereby realizing the gripping of the target object.

Similarly, responsive to the first drive motor 61 driving the first gear carrier 313 to rotate counterclockwise around the first fixed gear shaft and the second drive motor 62 driving the second gear carrier 413 to rotate clockwise around the second fixed gear shaft, the first fingertip 311 and the second fingertip 411 move away from each other, thereby realizing the releasing of the pair target object.

It can be understood that other structural details and operation details of the gripper in this embodiment may be referred to the relevant descriptions in the foregoing embodiments, which will not be repeated herein.

Figure 8:
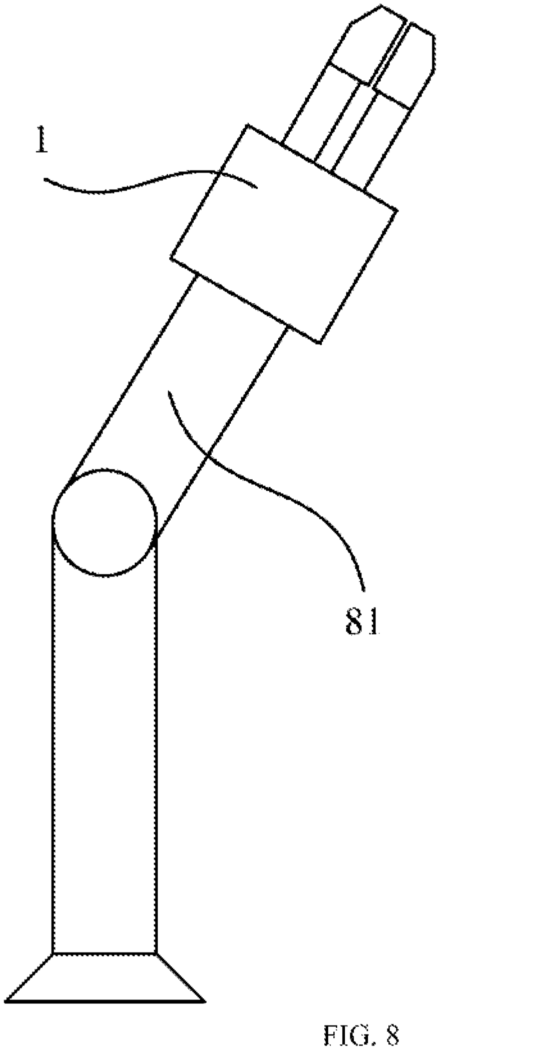
FIG. 8 is a schematic diagram of a robot according to an embodiment of the present disclosure.

Some embodiments of the present disclosure further provide a robot 8 including the gripper 1 described in the above embodiments. Referring to FIG. 8, in an embodiment, the robot 8 includes at least one robotic arm 81 and a gripper 1 disposed at an end portion of each of the at least one robotic arm 81. The driving assembly is configured to control the movement of the plurality of gripping assemblies to grasp or release the target object. In FIG. 8, the gripper includes two gripping assemblies. It can be understood that the gripper 1 may also include more gripping assemblies, such as three or more gripping assemblies.

According to the gripper and the robot provided in the embodiments of the present disclosure, a gear transmission configuration is adopted to realize the closing and opening operations between the fingertips of the gripper, so as to grasp or release the target object. In the embodiments, the gear transmission configuration does not have a dead angle of motion, thereby preventing from causing injury to the operator. In the entire transmission cycle, the engaging teeth of the gripper are uniformly loaded and are less likely to be worn, thereby preventing from causing the risk of short circuit of the electronic circuit due to fallen metal powder. The gripper also ensures the consistency of input driving force and output force at different opening distances of the fingertips. In addition, the gripper is compact in the gear transmission structure, easy to realize miniaturization design, high in transmission efficiency, good in transmission precision, and is convenient for maintenance and has long service life.

The technical features of the above-described embodiments may be combined arbitrarily according to the actual situation. As long as the combinations of these technical features do not contradictory, they shall fall within the scope of the description in this specification.

The above-mentioned embodiments merely illustrate several embodiments of the present disclosure, and the descriptions thereof are specific and detailed, but shall not be construed as a limitation to the scope of the disclosure. It should be pointed out that for those skilled in the art, some modifications and improvements may be made without departing from the concept of the present disclosure, which shall all fall within the protection scope of the present disclosure.

Therefore, the protection scope of the disclosure shall be limited by the appended claims.

What is claimed is:

1. A gripper, comprising:
- a case;
- a plurality of gripping assemblies respectively assembled to the case, wherein each of the plurality of gripping assemblies is provided with a fingertip at an end portion, and fingertips of the plurality of gripping assemblies are configured to cooperate with each other for grasping; wherein each of the plurality of gripping assemblies further comprises:
  - a gear set comprising a fixed gear, an intermediate gear and a fingertip gear engaged in sequence, wherein the fixed gear is fixedly connected to the case, and the fingertip gear is fixedly connected to the fingertip;
  - a gear carrier rotatably connected to the case, wherein the intermediate gear and the fingertip gear are mounted to the gear carrier, and the intermediate gear and the fingertip gear are respectively rotatably connected to the gear carrier, wherein the gear carrier is configured to rotate relative to the case around a center of the fixed gear; and
- a driving assembly configured to rotate the gear carrier, so as to move the plurality of gripping assemblies.

2. The gripper according to claim 1, wherein the driving assembly comprises a driving member, a lead screw-nut member and a plurality of driving rods respectively corresponding to the plurality of gripping assemblies;

wherein the lead screw-nut member comprises:
- a lead screw connected to the driving member to allow the driving member to rotate the lead screw;
- a nut configured to cooperate with the lead screw and to move along an axial direction of the lead screw responsive to rotation of the lead screw; and wherein a first end of each of the plurality of driving rods is connected to the nut by a pivot pin, and a second end of each of the plurality of driving rods is connected to the gear carrier of a corresponding one of the plurality of gripping assemblies by another pivot pin, to allow each of the plurality of driving rods to rotate the gear carrier of the corresponding one of the plurality of gripping assemblies responsive to the nut moving along the axial direction of the lead screw.

3. The gripper according to claim 2, wherein the case is further provided with a bearing positioning mechanism, and the lead screw-nut member is mounted to the bearing positioning mechanism of the case by at least one bearing.

4. The gripper according to claim 1, wherein the driving assembly comprises a plurality of driving devices, and each of the plurality of driving devices is configured to drive the gear carrier of a corresponding one of the plurality of gripping assemblies.

5. The gripper according to claim 4, wherein the plurality of driving devices are disposed outside the case, and an output end of each of the plurality of driving devices passes through the case to connect to the gear carrier of the corresponding one of the plurality of gripping assemblies.

6. The gripper according to claim 1, wherein the fixed gear is fixedly connected to a fixed gear shaft by a flat key, and the fixed gear shaft is fixedly mounted to the case to prevent rotating of the fixed gear shaft relative to the case.

7. The gripper according to claim 1, wherein the fixed gear, the intermediate gear and the fingertip gear are configured to be in a same plane.

8. The gripper according to claim 1, wherein the fixed gear and the fingertip gear have a same number of gear teeth and a same modulus.

9. A robot comprising a gripper, wherein the gripper comprises:
- a case;
- a plurality of gripping assemblies respectively assembled to the case, wherein each of the plurality of gripping assemblies is provided with a fingertip at an end portion, and fingertips of the plurality of gripping assemblies are configured to cooperate with each other for grasping; wherein each of the plurality of gripping assemblies further comprises:
  - a gear set comprising a fixed gear, an intermediate gear and a fingertip gear engaged in sequence, wherein the fixed gear is fixedly connected to the case, and the fingertip gear is fixedly connected to the fingertip;
  - a gear carrier rotatably connected to the case, wherein the intermediate gear and the fingertip gear are mounted to the gear carrier, and the intermediate gear and the fingertip gear are respectively rotatably connected to the gear carrier, wherein the gear carrier is configured to rotate relative to the case around a center of the fixed gear; and
- a driving assembly configured to rotate the gear carrier, so as to move the plurality of gripping assemblies.

10. The robot according to claim 9, wherein the driving assembly comprises a driving member, a lead screw-nut member and a plurality of driving rods respectively corresponding to the plurality of gripping assemblies;

wherein the lead screw-nut member comprises:

a lead screw connected to the driving member to allow the driving member to rotate the lead screw;

a nut configured to cooperate with the lead screw and to move along an axial direction of the lead screw responsive to rotation of the lead screw; and wherein a first end of each of the plurality of driving rods is connected to the nut by a pivot pin, and a second end of each of the plurality of driving rods is connected to the gear carrier of a corresponding one of the plurality of gripping assemblies by another pivot pin, to allow each of the plurality of driving rods to rotate the gear carrier of the corresponding one of the plurality of gripping assemblies responsive to the nut moving along the axial direction of the lead screw.

11. The robot according to claim 10, wherein the case is further provided with a bearing positioning mechanism, and the lead screw-nut member is mounted to the bearing positioning mechanism of the case by at least one bearing.

12. The robot according to claim 9, wherein the driving assembly comprises a plurality of driving devices, and each of the plurality of driving devices is configured to drive the gear carrier of a corresponding one of the plurality of gripping assemblies.

13. The robot according to claim 12, wherein the plurality of driving devices are disposed outside the case, and an output end of each of the plurality of driving devices passes through the case to connect to the gear carrier of the corresponding one of the plurality of gripping assemblies.

14. The robot according to claim 9, wherein the fixed gear is fixedly connected to a fixed gear shaft by a flat key, and the fixed gear shaft is fixedly mounted to the case to prevent rotating of the fixed gear shaft relative to the case.

15. The robot according to claim 9, wherein the fixed gear, the intermediate gear and the fingertip gear are configured to be in a same plane.

16. The robot according to claim 9, wherein the fixed gear and the fingertip gear have a same number of gear teeth and a same modulus.

* * * * *